United States Patent
Down et al.

(10) Patent No.: US 12,429,491 B2
(45) Date of Patent: Sep. 30, 2025

(54) LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Edward Down, Ludwigsburg (DE); Thomas Martin, Stugartt (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 781 days.

(21) Appl. No.: 17/451,541

(22) Filed: Oct. 20, 2021

(65) Prior Publication Data

US 2022/0163551 A1 May 26, 2022

(30) Foreign Application Priority Data

Nov. 23, 2020 (EP) ..................... 20209164

(51) Int. Cl.
  *G01N 35/04* (2006.01)
  *B01L 7/00* (2006.01)
  *G01N 35/00* (2006.01)

(52) U.S. Cl.
  CPC .......... *G01N 35/04* (2013.01); *B01L 7/00* (2013.01); *G01N 2035/0465* (2013.01); *G01N 2035/0477* (2013.01); *G01N 2035/0496* (2013.01)

(58) Field of Classification Search
  CPC . G01N 2035/0477; G01N 2035/00346; G01N 2035/00445; G01N 2035/0406; G01N 2035/0491; B65G 54/02; B01L 3/50
  See application file for complete search history.

(56) References Cited

U.S. PATENT DOCUMENTS

| 3,273,727 A | 9/1966 | Rogers et al. |
| 3,610,695 A | 10/1971 | Yabuta |

(Continued)

FOREIGN PATENT DOCUMENTS

| CN | 201045617 Y | 4/2008 |
| CN | 102109530 A | 6/2011 |

(Continued)

OTHER PUBLICATIONS

European Search Report issued Apr. 22, 2021, in Application No. 20209164.1, 3 pp.

*Primary Examiner* — Neil N Turk
*Assistant Examiner* — Benjamin Joseph Kass
(74) *Attorney, Agent, or Firm* — Woodard, Emhardt, Henry, Reeves & Wagner, LLP

(57) ABSTRACT

A laboratory sample distribution system is provided comprising: a number of container carriers, wherein the container carriers each comprise a magnetically active device and are adapted to carry a sample container; at least one fan being adapted to cause an airflow; and a number of transport modules, the transport modules being arrangeable adjacent to one another and respectively comprising: a transport surface being adapted to carry the container carriers; a number of heat dissipating electromagnetic actuators being stationary arranged below the transport surface, the electromagnetic actuators being adapted to move container carriers placed on top of the transport surface by applying magnetic forces to the container carriers; and an air guiding element being adapted to guide the airflow first towards an underside of the transport surface and afterwards towards the electromagnetic actuators.

15 Claims, 2 Drawing Sheets

(56) References Cited

U.S. PATENT DOCUMENTS

| | | |
|---|---|---|
| 3,653,485 A | 4/1972 | Donlon |
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,020,297 A | 6/1991 | Borie et al. |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 10,006,927 B2 | 6/2018 | Sinz et al. |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,175,259 B2 | 1/2019 | Riether |
| 10,197,586 B2 | 2/2019 | Sinz et al. |
| 10,239,708 B2 | 3/2019 | Sinz |
| 10,261,103 B2 | 4/2019 | Pedain |
| 10,288,634 B2 | 5/2019 | Kaeppeli |
| 10,352,953 B2 | 7/2019 | Huber et al. |
| 10,416,183 B2 | 9/2019 | Hassan |
| 10,450,151 B2 | 10/2019 | Heise et al. |
| 10,495,657 B2 | 12/2019 | Malinowski |
| 10,509,049 B2 | 12/2019 | Sinz et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0139311 A1* | 6/2009 | Lehto .................. B01L 7/00 73/864.91 |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |

(56) References Cited

U.S. PATENT DOCUMENTS

| | | |
|---|---|---|
| 2015/0276782 A1* | 10/2015 | Riether .................. G01N 35/04 700/230 |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |
| 2017/0108522 A1 | 4/2017 | Baer |
| 2017/0131309 A1* | 5/2017 | Pedain .................. B65G 54/02 |
| 2017/0131310 A1 | 5/2017 | Volz et al. |
| 2017/0160299 A1 | 6/2017 | Schneider et al. |
| 2017/0168079 A1 | 6/2017 | Sinz |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0128848 A1 | 5/2018 | Schneider et al. |
| 2018/0188280 A1 | 7/2018 | Malinowski |
| 2018/0210000 A1 | 7/2018 | van Mierlo |
| 2018/0210001 A1 | 7/2018 | Reza |
| 2018/0224476 A1 | 8/2018 | Birrer et al. |
| 2018/0340951 A1 | 11/2018 | Kaeppell |
| 2018/0340952 A1* | 11/2018 | Kaeppeli ................ G01N 35/04 |
| 2018/0348244 A1 | 12/2018 | Ren |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |
| 2020/0400698 A1 | 12/2020 | Hafner et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 3172576 A1 | 5/2017 |
| EP | 3575801 A1 | 12/2019 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-143685 A | 6/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/064662 A1 | 5/2013 |
| WO | 2013/143950 A2 | 10/2013 |
| WO | 2013/152089 A1 | 10/2013 |
| WO | 2013/169778 A1 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |
| WO | 2016/116972 A1 | 7/2016 |
| WO | 2019/050840 A1 | 3/2019 |

* cited by examiner

LABORATORY SAMPLE DISTRIBUTION SYSTEM AND LABORATORY AUTOMATION SYSTEM

CROSS-REFERENCE TO RELATED APPLICATIONS

This application claims priority to European Patent Application No. 20209164.1, filed 23 Nov. 2020, the disclosure of which is hereby incorporated by reference in its entirety.

TECHNICAL FIELD

The present disclosure relates to a laboratory sample distribution system and to a laboratory automation system.

BACKGROUND

A laboratory sample distribution system forming the basis of the present disclosure is disclosed in WO 2013/064662 A1. The laboratory sample distribution system comprises a number of container carriers, wherein the container carriers each comprise a magnetically active device and are adapted to carry a sample container. The laboratory sample distribution system further comprises a transport surface being adapted to carry the container carriers. The laboratory sample distribution system further comprises heat dissipating electromagnetic actuators being stationary arranged below the transport surface. The electromagnetic actuators are adapted to move container carriers placed on top of the transport surface by applying magnetic forces to the container carriers.

SUMMARY

Although the embodiments of the present disclosure are not limited to specific advantages or functionality, it is noted that in accordance with the present disclosure a laboratory sample distribution system and a laboratory automation system are provided that reduce the transfer of heat generated by the electromagnetic actuators towards the container carriers.

In accordance with one embodiment of the present disclosure, a laboratory sample distribution system is provided, comprising: a number of container carriers, wherein the container carriers each comprise a magnetically active device and are adapted to carry a sample container; at least one fan being adapted to cause an airflow; and a number of transport modules, the transport modules being arrangeable adjacent to one another and respectively comprising: a transport surface being adapted to carry the container carriers; a number of heat dissipating electromagnetic actuators being stationary arranged below the transport surface, the electromagnetic actuators being adapted to move container carriers placed on top of the transport surface by applying magnetic forces to the container carriers; and an air guiding element being adapted to guide the airflow first towards an underside of the transport surface and afterwards towards the electromagnetic actuators.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
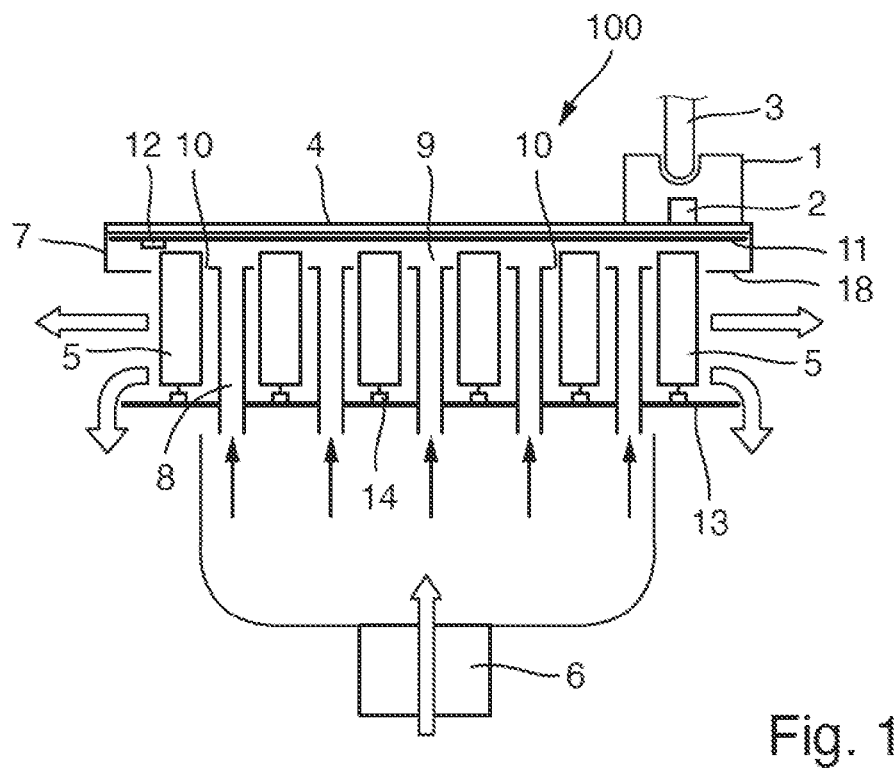
FIG. 1 shows a schematic cross section of an inventive transport module in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The laboratory sample distribution system comprises a number, e.g., between 1 and 10,000, of container carriers, wherein the container carriers each comprise a magnetically active device, e.g., in form of a permanent magnet. The container carriers are adapted to carry a sample container, the sample container typically containing a sample to be analyzed.

The laboratory sample distribution system further comprises at least one fan being adapted to cause an airflow.

The laboratory sample distribution system further comprises a number, e.g., between 1 and 500, of transport modules. The transport modules are arrangeable adjacent to one another to form a common transport surface.

Each transport module comprises a transport surface being adapted to carry or support the container carriers, and a number, e.g., between 1 and 120, of heat dissipating electromagnetic actuators, e.g., in form of coils or solenoids, being stationary arranged below the transport surface in rows and columns. The electromagnetic actuators are adapted to move container carriers placed on top of the transport surface along individual transport paths by applying magnetic forces to the container carriers.

Each transport module comprises an air guiding element being adapted to guide the airflow or a part of the airflow generated by the at least one fan first towards an underside of the transport surface and afterwards towards the electromagnetic actuators. The air guiding element may be formed such that a reflow of air from the electromagnetic actuators towards the underside of the transport surface is prevented.

According to an embodiment the air guiding element comprises a number, e.g., 8, of air guiding pipes. The air guiding element forms a chamber under the transport surface, wherein the electromagnetic actuators are arranged at least partially outside of the chamber. The air guiding pipes guide the airflow into the chamber. The chamber has a number of openings, wherein the airflow leaves the chamber through the openings towards/along the electromagnetic actuators.

According to an embodiment a respective transport module 100 comprises a first printed circuit board comprising position sensors sensing positions of the container carriers placed on top of the transport surface, wherein the first printed circuit board is arranged at the underside of the transport surface.

According to an embodiment a respective transport module 100 comprises a second printed circuit board comprising driving circuits for supplying the electromagnetic actuators with driving currents, wherein the second printed circuit board is arranged spaced from and parallel to the first printed circuit board, wherein the electromagnetic actuators are arranged between the first printed circuit board and the second printed circuit board.

According to an embodiment the air guiding element forms a number of air guiding compartments, the air guiding compartments being adapted to guide the airflow originating from the air guiding pipes below the transport surface downwards towards the electromagnetic actuators and/or sidewards towards an outer boundary of the transport module.

According to an embodiment the number of air guiding compartments is formed inside the chamber.

According to an embodiment the number of air guiding compartments is at least partially formed or bordered by walls extending from a center point of the chamber towards the outer boundary of the transport module.

According to an embodiment the air guiding element comprises a driving surface support supporting the transport surface.

The first printed circuit board may be arranged on top of the driving surface support.

The driving surface support may form a wall of the chamber.

According to an embodiment each transport module comprises a fan being adapted to cause a/the respective airflow.

The laboratory automation system comprises a number, e.g., 1 to 100, of pre-analytical, analytical and/or post-analytical laboratory stations, and an above mentioned laboratory sample distribution system, the laboratory sample distribution system being adapted to distribute the container carriers and/or sample containers between the laboratory stations.

According to an embodiment of the disclosure, cold air is guided in the direction of the underside of the transport surface first and is afterwards directed towards the heat dissipating electromagnetic actuators. The air guiding element is embodied such that cold air below the transport surface is separated from warm air around the electromagnetic actuators, such that mixing of warm air around the electromagnetic actuators and cold air below the transport surface is prevented.

Heat from the electromagnetic actuators influences the temperature of samples contained in the sample containers. Heat is transferred through the transport surface towards the container carriers. Since heat flow requires a temperature gradient and there are no other major heat sources that have an impact on sample temperature, the sample temperature cannot rise above the temperature of the transport surface. Therefore, limiting the temperature of the transport surface and preventing or at least limiting warm airflow/convective heat transfer through the transport surface is an effective approach to limit sample temperatures.

This is achieved by directing cold air to the bottom of the transport surface first, e.g., through guiding pipes located between the electromagnetic actuators. The cold air flows below the transport surface so that the transport surface will not be heated by warm air originating from the electromagnetic actuators. After passing the underside of the transport surface, the air is directed downwards to the electromagnetic actuators, which are the main heat source in the transport module.

Here, the air cools the electromagnetic actuators while being heated up itself. The temperature of the heated air can become much higher than the allowed sample temperature without any significant impact on the temperature of the transport surface because a reflow of the heated air to the transport surface—hence remixing with cold air—is inhibited by design. For this purpose, the air guiding element is designed as an air separating structure. This air separating structure has only small openings which result in a defined airflow of cold air from below the transport surface downwards and towards the electromagnetic actuators without any reverse flow upwards.

The inventive air cooling has been investigated both by thermal CFD (computational fluid dynamics) simulations as well as by testing.

Thermal CFD analysis showed that the required airflow rates for sufficient cooling could be reduced by as much as 65% with an airflow design based on 8 air guiding pipes and an air separating structure. This improvement increases the dust filter replacement interval by a factor of 10, which has a very strong impact on maintenance costs of the system. Alternatively, the size of dust filters on side panels and thereby the size of the side panels themselves can be reduced to improve the appearance of the system. Further, the disclosure reduces noise emissions by more than 20 dB (A) in terms of sound pressure.

In order that the embodiments of the present disclosure may be more readily understood, reference is made to the following examples, which are intended to illustrate the disclosure, but not limit the scope thereof.

FIG. 1 shows a schematic cross section of an inventive transport module 100. The transport module 100 comprises a transport surface 4 being adapted to carry container carriers 1. For the ease of description only one exemplary container carrier 1 is depicted.

The container carriers 1 respectively comprise a magnetically active device in form of a permanent magnet 2 and are adapted to carry a sample container 3 typically comprising a sample to be analyzed.

The transport module 100 comprises a number, e.g., 64, of heat dissipating electromagnetic actuators in form of coils 5 being stationary arranged below the transport surface 4 in rows and columns.

The electromagnetic actuators 5 move container carriers 1 placed on top of the transport surface 4 by applying magnetic forces to the container carriers 1.

The transport module 100 comprises a fan 6 being adapted to cause an airflow. The transport module 100 comprises an air guiding element 7 being adapted to guide the airflow first towards an underside of the transport surface 4 and afterwards towards the electromagnetic actuators 5.

The air guiding element 7 forms a chamber 9 under the transport surface 4, wherein a main portion of the electromagnetic actuators 5 are arranged outside of the chamber 9. The air guiding element 7 comprises a number of eight air guiding pipes 8 guiding the airflow into the chamber 9. The chamber 9 has a number of openings 10, wherein the airflow leaves the chamber 9 through the openings 10 towards the electromagnetic actuators 5.

The transport module 100 comprises a first printed circuit board 11 comprising position sensors 12 sensing positions of the container carriers 1 placed on top of the transport surface 4, wherein the first printed circuit board 11 is arranged at the underside of the transport surface 4.

The transport module 100 comprises a second printed circuit board 13 comprising driving circuits 14 for supplying the electromagnetic actuators 5 with driving currents, wherein the second printed circuit board 13 is arranged spaced from and parallel to the first printed circuit board 11, wherein the electromagnetic actuators 5 are arranged between the first printed circuit board 11 and the second printed circuit board 13.

Figure 2:
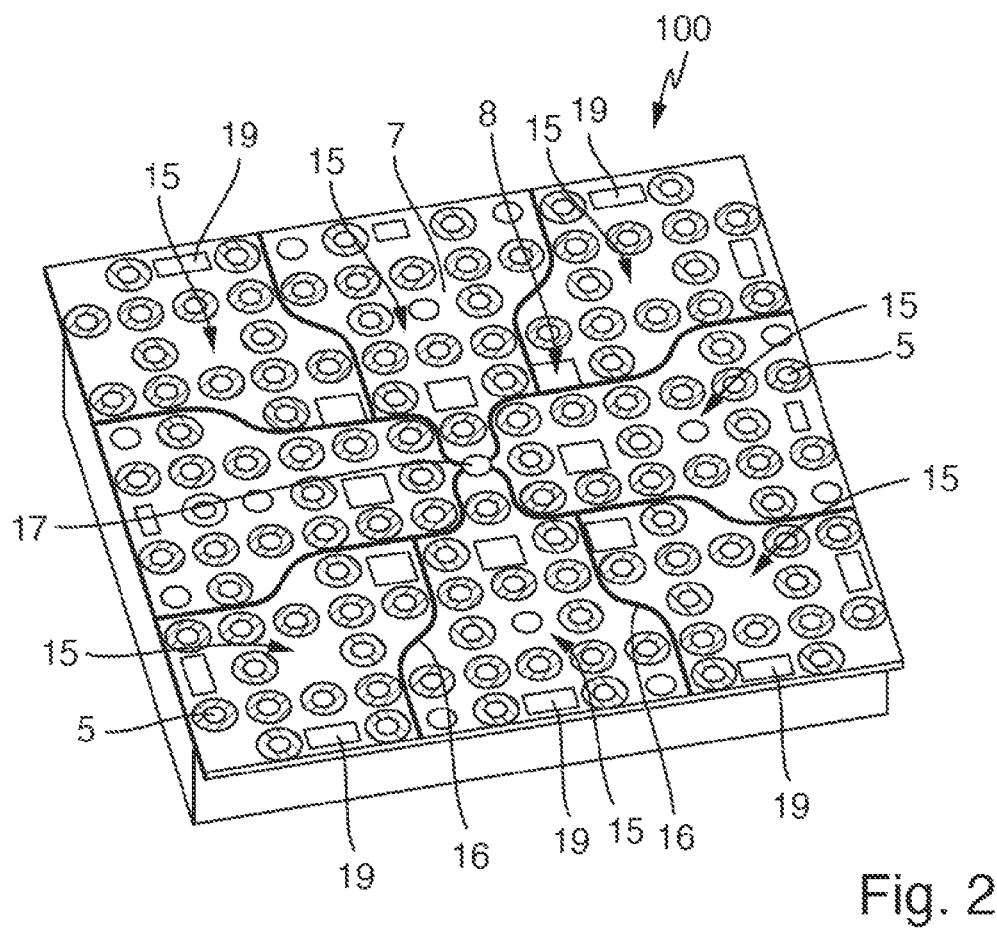
FIG. 2 shows a perspective view on an inventive transport module in accordance with an embodiment of the present disclosure.

Now referring to FIG. 2 depicting a perspective view on the transport module 100 of FIG. 1, the air guiding element 7 forms eight air guiding compartments 15 arranged inside the chamber 9, the air guiding compartments 15 guiding the airflow originating from the corresponding air guiding pipe 8 below the transport surface 4 towards an outer boundary of the transport module 100. The air guiding compartments 15 are bordered by walls 16 extending from a center point 17 of the chamber 9 towards the outer boundary of the transport module 100.

The air guiding element 7 comprises openings 19 at its outer boundary providing an exit path downwards for the air that is flowing sideways from the air guiding pipes 8 to the boundary area of the transport module 100. Without the openings 19 in the border area, the airflow towards the sides would not be sufficient. As a result, the transport surface 4 in the outer region of the transport module 100 would be warmer compared to the center region.

Again referring to FIG. 1, the air guiding element 7 comprises a driving surface support 18 supporting the transport surface 4. The first printed circuit board 11 is arranged on top of the driving surface support 18. The driving surface support 18 forms a wall of the chamber 9.

Figure 3:
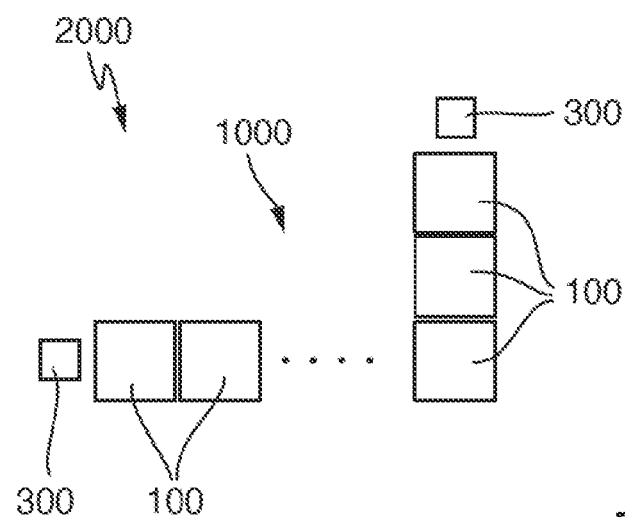
FIG. 3 shows a highly schematic block diagram of an inventive laboratory automation system in accordance with an embodiment of the present disclosure.

FIG. 3 shows a highly schematic block diagram of an inventive laboratory automation system 2000. The laboratory automation system 2000 comprises laboratory stations 300 and a laboratory sample distribution system 1000 being formed by multiple transport modules 100 as depicted in FIGS. 1 and 2 arranged adjacent to one another to form a common transport surface. The laboratory sample distribution system 1000 distributes the container carriers 1 between the laboratory stations 300.

What is claimed is:

1. A laboratory sample distribution system, comprising:
    a number of container carriers, wherein the container carriers each comprise a magnetically active device and are adapted to carry a sample container,
    at least one fan being adapted to cause an airflow, and
    a number of transport modules, the transport modules being arranged adjacent to one another and respectively comprising:
    a transport surface being adapted to carry the container carriers,
    a number of spaced apart, heat dissipating electromagnetic actuators stationarily arranged below an underside of the transport surface, the electromagnetic actuators being adapted to move container carriers placed on top of the transport surface by applying magnetic forces to the container carriers, and
    an air guiding element being adapted to guide the airflow first towards the underside of the transport surface and afterwards towards the electromagnetic actuators,
        wherein the air guiding element comprises a chamber under the transport surface and a number of air guiding pipes extending vertically between the electromagnetic actuators and into the chamber,
        the air guiding pipes including top end openings positioned to direct air exiting the air guiding pipes into the chamber and against the underside of the transport surface,
        the at least one fan directing air upwardly through the air guiding pipes, into the chamber, and against the underside of the transport surface,
        the chamber comprising openings communicating the chamber with the electromagnetic actuators below the chamber, air exiting from the chamber through the openings moving downwardly and outwardly between the electromagnetic actuators and the air guiding pipes.

2. The laboratory sample distribution system according to claim 1, characterized in that a respective transport module comprises a first printed circuit board comprising position sensors sensing positions of the container carriers placed on top of the transport surface, wherein the first printed circuit board is arranged at the underside of the transport surface.

3. The laboratory sample distribution system according to claim 2, characterized in that a respective transport module comprises a second printed circuit board comprising driving circuits for supplying the electromagnetic actuators with driving currents, wherein the second printed circuit board is arranged spaced from and parallel to the first printed circuit board, wherein the electromagnetic actuators are arranged between the first printed circuit board and the second printed circuit board.

4. The laboratory sample distribution system according to claim 1, characterized in that the air guiding element forms a number of air guiding compartments, the air guiding compartments being adapted to guide the airflow originating from the air guiding pipes below the transport surface downwards towards the electromagnetic actuators and/or sidewards towards an outer boundary of the transport module.

5. The laboratory sample distribution system according to claim 4, characterized in that the number of air guiding compartments is formed inside the chamber.

6. The laboratory sample distribution system according to claim 5, characterized in that the number of air guiding compartments is bordered by walls extending from a center point of the chamber towards the outer boundary of the transport module.

7. The laboratory sample distribution system according to claim 1, characterized in that the air guiding element comprises a driving surface support supporting the transport surface.

8. The laboratory sample distribution system according to claim 2, characterized in that the first printed circuit board is arranged on top of the driving surface support.

9. The laboratory sample distribution system according to claim 7, characterized in that the driving surface support forms a wall of the chamber.

10. The laboratory sample distribution system according to claim 1, characterized in that each transport module comprises a fan adapted to cause a respective airflow.

11. The laboratory sample distribution system of claim 1, and further comprising air guiding compartments formed by walls extending downwardly from a transport plane and forming an outer boundary, wherein the air guiding compartments further guide air exiting from the air guiding pipes, each air guiding compartment positioned above multiple electromagnetic actuators.

12. The laboratory sample distribution system of claim 11, wherein the electromagnetic actuators are arranged at least partially outside of the chamber.

13. The laboratory sample distribution system of claim 12, wherein the electromagnetic actuators extend above the upper ends of the air guiding pipes.

14. The laboratory sample distribution system of claim 13, wherein the air guiding pipes include top end flanges and the electromagnetic actuators extend above the top end flanges of the air guiding pipes.

15. The laboratory sample distribution system of claim 14, wherein the top end openings are formed between the air guiding pipes and the electromagnetic actuators.

* * * * *